United States Patent Office 3,140,263
Patented July 7, 1964

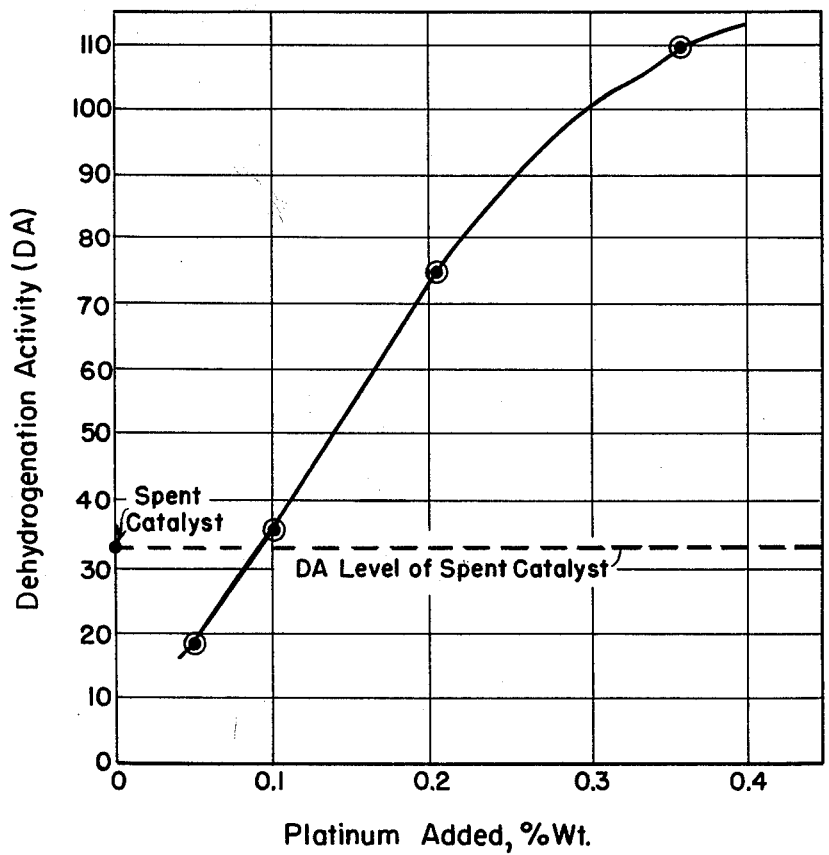

3,140,263
REJUVENATION OF PLATINUM CATALYST
John W. Payne, Woodbury, N.J., assignor to Socony Mobil Oil Company, Inc., a corporation of New York
Filed Aug. 5, 1960, Ser. No. 47,843
3 Claims. (Cl. 252—412)

This invention relates to a method for rejuvenating a spent supported platinum catalyst. More particularly, the present invention is concerned with a method for reconstituting a spent platinum supported catalyst by rejuvenation of the same in place in the reactor vessel.

Catalysts, containing small amounts of platinum generally distributed over a porous oxide support such as alumina or silica-alumina composites, are widely employed in hydrocarbon conversion processes, such as for example reforming, isomerization, and hydrocracking of petroleum hydrocarbons. In such processes, the platinum-containing catalyst gradually loses activity due to the deposition thereon of carbonaceous deposits and changes in the platinum structure. Treating the catalysts at elevated temperatures in an oxygen-containing atmosphere removes the carbonaceous deposits and during initial periods of use generally restores activity to a satisfactory level. However, since the changes in platinum structure taking place are permanent, continued operation eventually decreases the dehydrogenation activity of the catalyst attributable to the presence therein of platinum, to a level which is ineffective for the intended catalytic reaction. It has heretofore been customary when such level is reached to replace the spent platinum-containing catalyst with fresh catalyst.

However, as will be realized, the above designated catalysts are expensive, not only because of the platinum which they contain, but also because of the relatively high cost involved in manufacture of these catalysts. Thus, it is highly advantageous to extend the life of the subject catalyst and to thus prolong its period of usefulness in catalytically effecting the desired conversion of hydrocarbons therewith.

In accordance with the invention described herein, a method has been discovered for rejuvenating spent hydrocarbon conversion catalysts consisting essentially of platinum deposited on a porous solid support. Thus, in one embodiment, the present invention comprises a method for rejuvenating a spent platinum supported catalyst, initially containing about 0.35 to about 1 weight percent platinum deposited on a solid porous support and which has been employed in a hydrocarbon conversion operation, by burning carbonaceous deposit from the spent catalyst in a combustion supporting atmosphere at an elevated temperature, cooling the catalyst after burning to below the boiling point of the platinum compound impregnating solution employed, contacting the cooled catalyst with said impregnating solution of sufficient platinum compound concentration to deposit at least 0.2 weight percent platinum (dry basis) on the catalyst, drying the catalyst by passing a heated gas therethrough and reheating to the hydrocarbon conversion reaction temperature.

In another embodiment, the invention provides a method for rejuvenation of a spent particle-form platinum reforming catalyst of 0.35 to 0.6 weight percent platinum deposited on alumina in place in the commercial reforming reactor by burning carbonaceous deposit from the spent catalyst in a combustion-supporting atmosphere at an elevated temperature, cooling the catalyst after burning by circulating a cooling gas therethrough to below the boiling point of chloroplatinic acid, contacting the cooled catalyst particles with a solution of chloroplatinic acid solution of sufficient concentration to deposit 0.35 to 0.6 weight percent platinum (dry basis) on the catalyst, drying the catalyst particles by passing a heated gas therethrough and reheating to the reforming reaction temperature.

In still another embodiment, the invention affords a method for rejuvenation of a spent supported platinum hydrocarbon conversion catalyst which has undergone a decrease in dehydrogenation activity as a result of use in hydrocarbon conversion operation by freeing the surface of carbonaceous deposit laid down during the hydrocarbon conversion operation, evacuating the spent catalyst to a reduced pressure, impregnating the catalyst maintained under reduced pressure with a solution of a platinum compound of concentration sufficient to deposit on the spent catalyst additional platinum in an amount of at least 0.2 weight percent and, thereafter, heating the resulting composite to the temperature at which the aforesaid hydrocarbon conversion is carried out.

The method described herein is contemplated as being suitable for revivifying platinum supported catalysts which undergo a decrease in dehydrogenation activity upon use in catalyzing hydrocarbon conversion. Typical reactions wherein platinum deposited on a porous oxide support have been used include reforming, isomerization, hydrocracking and aromatization of various hydrocarbons and hydrocarbon mixtures. These reactions are carried out at an elevated temperature, generally in the approximate range of 400° F. to 1000° F. under conditions well known in the art. Thus, reforming is ordinarily effected at a temperature between about 700° F. and about 1000° F.; isomerization employs a temperature generally in the range of 400° F. to 900° F. and hydrocracking utilizing the catalysts in question is usually carried out at a temperature between 600° F. and 1000° F.

The porous oxide support upon which platinum is deposited is generally an aluminous or siliceous porous solid. Thus, typical supports which have been used for these catalysts include alumina, silica, and silica-alumina composites as well as composites of silica with zirconia, magnesia, thoria, titania, hafnia and beryllia.

The amount of platinum deposited on these supports has varied widely. The catalysts undergoing treatment in accordance with the present invention generally contain an initial platinum content within the range of 0.35 to 1 percent by weight. Thus, a typical commercial reforming catalyst having a platinum content of between about 0.35 and about 0.6 weight percent was found to be effectively rejuvenated in accordance with the present method.

During use of the aforesaid catalysts in effecting hydrocarbon conversion, a carbonaceous deposit commonly referred to as "coke" is laid down on the catalyst surface which tends to interfere with the activity of the catalyst and which, in accordance with conventional procedure, is periodically removed from the catalyst by burning in a combustion-supporting atmosphere such as air or other oxygen-containing gas at an elevated temperature. It is essential to the success of the present method of rejuvenation that the catalyst be substantially free of such carbonaceous deposit before undergoing treatment with the platinum compound impregnating solution. It is also essential, as will be evident from data hereinafter set forth, to deposit at least 0.2 weight percent platinum on the spent catalyst undergoing treatment in order to effectively rejuvenate the catalyst. Thus, deposition on the spent catalyst of platinum in an amount of 0.1 weight percent or less was ineffective in accomplishing the desired rejuvenation. Amounts of platinum between 0.1 and 0.2 weight percent showed only a slight increase in dehydrogenation activity of the spent catalyst.

Rejuvenation is, accordingly accomplished by contacting the spent supported platinum catalyst, substantially free of carbonaceous deposit, with a solution of a platinum compound of concentration sufficient to deposit on the spent catalyst additional platinum in an amount of at least 0.2 weight percent. The catalyst, after such treatment, is drained of excess solution, if any, and thereafter dried and calcined, in an atmosphere which does not adversely affect the catalyst such as for example, air or hydrogen and, generally, at a temperature in the range of 400° F. to 1200° F. As a practical matter the calcination step will generally involve reheating the rejuvenated catalyst to the temperature at which the hydrocarbon conversion reaction employing such catalyst is carried out.

The amount of additional platinum deposited on the spent catalyst will generally not exceed about 1 weight percent. A particularly effective amount of added platinum has been found to be that approximately equal to the platinum content of the initial catalyst, i.e. within the range of about 0.35 to 1 percent by weight. Thus, for a typical reforming catalyst of platinum on alumina, the amount of added platinum is within the approximate range of 0.35 to 0.6 weight percent. It is contemplated that the rejuvenation procedure described herein may be applied to the same catalyst batch several times, generally until the point is reached where it is considered desirable for investment purposes to recover the platinum from the catalyst.

As impregnating solutions, generally an aqueous solution of chloroplatinic acid will be employed. It is within the purview of the invention, however, to utilize solutions in which solvents other than water are present, such as alcoholic solutions, etc. Also, as will be realized, platinum compound other than chloroplatinic acid may be employed such as for example ammonium platinum chloride, trimethylbenzyl ammonium platinum chloride, tetraamino platino chloride, ammonium platino nitrate, and other platinum compounds, which have heretofore been used in initial preparation of the platinum supported catalyst.

A particularly effective method for accomplishing impregnation of the spent catalyst which has been found to result in a catalyst of enhanced dehydrogenation activity entails evacuating the spent catalyst, after removal therefrom of carbonaceous deposit, to a pressure within the range of about 5 to about 400 mm. of mercury and contacting the catalyst maintained under such pressure with the platinum compound impregnating solution of concentration sufficient to deposit on the spent catalyst additional platinum in the amount of at least 0.2 weight percent.

It is a preferred embodiment of the invention to rejuvenate the spent supported platinum catalyst in place in the reactor vessel in which the hydrocarbon conversion reaction is accomplished. Thus, it is customary practice to utilize the catalyst in the form of particles in a bed situated in a suitable reactor wherein contact is made with the hydrocarbon charge under catalytic conversion conditions. Following the teachings of this invention, the bed of catalyst particles having a reduced dehydrogenation activity as a result of employment in effecting catalytic conversion of the hydrocarbon charge at elevated temperature under conditions such that a carbonaceous deposit is laid down on the catalyst is subjected to the steps of burning the carbonaceous deposit from the spent catalyst particles in a combustion-supporting atmosphere, cooling the catalyst after burning by circulating therethrough a cooling gags such as flue gas, nitrogen, air or other gas which does not adversely affect the catalyst to reduce the temperature of the catalyst bed to below the boiling point of the platinum compound impregnating solution subsequently used. Thereafter, the catalyst bed is contacted, suitably by spraying, with the impregnating solution of requisite concentration to deposit at least 0.2 weight percent additional platinum thereon. Any excess solution is drained from the catalyst bed and recovered for future use. The catalyst bed is then dried and reheated in the usual manner to the temperature at which hydrocarbon conversion reaction is carried out.

The above-described method of adding the impregnating solution to the top of the catalyst bed may result in a non-uniform deposition of platinum on the catalyst when the catalyst in the upper part of the bed receives more platinum than that in the lower part of the bed.

An alternate method of contacting the catalyst with the impregnating solution involves withdrawal of the catalyst from the reactor vessel, screening to remove fines and dust, then recharging the screened catalyst to the reactor vessel at a uniform rate through an elongated pipe. During the recharging of the catalyst, the requisite amount of impregnating solution is fed at a uniform rate to the catalyst stream at the top of elongated pipe, the volume of impregnating solution being just sufficient to fill the pores of the catalyst, and the concentration of platinum compound contained therein being sufficient to add the requisite amount of platinum. The catalyst bed is then dried as described hereinabove. Such method of adding the impregnating solution to the catalyst affords a uniform distribution of platinum on the catalyst.

The test utilized herein to determine dehydrogenation activity of the spent and rejuvenated catalysts involves determination of the amount of benzene produced from cyclohexane under carefully controlled conditions. One cc. of material, of which 5.5 milligrams is the catalyst sample and the balance is Vycor or ground glass is utilized in the test. Both the catalyst sample and the inert material are ground to 100–150 mesh particle size and thoroughly mixed before being charged to the reactor. The reactor is then placed in a furnace and the unit is purged with nitrogen, then filled with hydrogen at 750° F. and 350 p.s.i.g. pressure. The hydrogen rate is held at 2.24 liters per minute and pure cyclohexane is charged at 100 cc. per hour for 20 minutes. The liquid product from the first 5 minutes is discarded and material made during the last 15 minutes is analyzed by mass spectrometry for benzene. The mol percent benzene realized is compared with the mol percent benzene obtained from a run on a standard catalyst (a fresh commercial reforming catalyst containing 0.6 weight percent platinum deposited on alumina) and the result is reported as percent of the standard.

The following examples will serve to illustrate the method of the invention without limiting the same:

EXAMPLE 1

A platinum on alumina catalyst containing 0.35 weight percent platinum was employed in a reforming unit under commercial reforming conditions utilizing a naphtha charge stock having a boiling range of 180 to 380° F., and employing a temperature of 950° F., a pressure of 500 p.s.i.g. and a liquid hourly space velocity of 1.0. At the end of 63 days under these conditions, the dehydrogenation activity of the catalyst, determined as described hereinabove, had declined from an initial value of 70 to 66.

One gram of the spent catalyst was contacted with an aqueous solution of chloroplatinic acid containing 0.74 percent weight platinum at room temperature (approximately 75° F.) and atmospheric pressure, using 0.48 cc. of chloroplatinic acid solution per gram of catalyst. The catalyst so treated was then dried by heating to a temperature of 900° F. at a rate of about 10° F. per minute.

The resultant catalyst product upon testing was found to possess a dehydrogenation activity of 114. Thus, not only had the dehydrogenation activity of the spent catalyst been restored but was found to exceed that of the initially employed catalyst.

EXAMPLE 2

A reforming catalyst of 0.6 weight percent platinum deposited on alumina was employed in a commercial reforming unit using a naphtha charge stock boiling in the range of 175 to 380° F., a temperature of 960° F., a pressure of 500 p.s.i.g. and a liquid hourly space velocity of 1.0. After 360 days' operation under the above conditions, it was found that the dehydrogenation activity had markedly declined from 100 to 16.

Two and two-tenths grams of this spent catalyst, after burning to remove coke therefrom, were contacted with aqueous chloroplatinic acid solution and dried as in Example 1.

The resulting catalyst product upon testing was found to possess a dehydrogenation activity of 105, showing that such property had, as a result of the indicated treatment, been fully restored to its initial value.

EXAMPLE 3

A commercial reforming catalyst of approximately 0.6 weight percent platinum on alumina was used in a reforming unit for a period of 540 days employing a naphtha charge stock boiling in the range of 180 to 380° F., a temperature of 960° F., a pressure of 550 p.s.i.g. and a liquid hourly space velocity of 1.0. At the end of this time, it was found that the dehydrogenation activity of the catalyst had dropped from an initial value of 100 to 19.

Two and one-tenth grams of the spent catalyst were contacted with aqueous chloroplatinic acid solution containing 0.74 percent weight platinum at room temperature and atmospheric pressure, using 0.48 cc. of chloroplatinic acid solution per gram of catalyst. The catalyst, after treatment, was dried to a temperature of 900° F. at a rate of about 10° F. per minute.

The dehydrogenation of the resulting catalyst was found to have been increased from 19 to 43.

EXAMPLE 4

The spent catalyst described in Example 3 was contacted in an amount of 2.2 grams with the same chloroplatinic acid solution used in Example 3 but in this instance the spent catalyst particles were evacuated to a pressure of 300 mm. of mercury and thereafter contacted at room temperature while under such vacuum with the chloroplatinic acid impregnating solution. The catalyst was then dried under the conditions of Example 3 and tested for dehydrogenation activity.

The resultant catalyst was found to possess a dehydrogenation activity of 68, indicating that the vacuum impregnation technique utilized in the present example afforded an increase in dehydrogenation activity over that attained under comparable conditions but wherein impregnation was effected as in Example 3 at atmospheric pressure.

The results obtained, initial platinum content and manner of impregnation for the catalysts of Examples 1 to 4 are summarized below in Table I.

*Table I*

| Example | Initial Platinum Content, percent Wt. | Pressure During Impregnation | Dehydrogenation Activity | |
|---|---|---|---|---|
| | | | Before Rejuvenation | After Rejuvenation |
| 1 | 0.35 | Atmospheric | 66 | 114 |
| 2 | 0.6 | do | 16 | 105 |
| 3 | 0.6 | do | 19 | 43 |
| 4 | 0.6 | Vacuum | 19 | 68 |

It will be evident that in each instance a marked increase in dehydrogenation activity for the revivified catalyst was achieved.

The following examples will serve to illustrate the effect of varying amounts of added platinum to the spent catalyst and show the criticality of additional platinum in an amount of at least 0.2 weight percent.

*Examples 5–8*

A reforming catalyst of 0.6 weight percent platinum deposited on alumina was employed in a commercial reforming unit using a naphtha charge stock boiling in the range of 180 to 380° F., a temperature of 950° F., a pressure of 500 p.s.i.g. and a liquid hourly space velocity of 1.0. After 1180 days' operation under the foregoing conditions, it was found that the dehydrogenation activity had dropped from an initial value of 100 to 33.

Four 50 gram samples of the above spent catalyst, after burning to remove coke therefrom, were separately impregnated with varying amounts of platinum. The impregnation technique involved evacuation of the catalyst samples in each case, purging with gaseous carbon dioxide and contacting with an aqueous solution of chloroplatinic acid of sufficient concentration to deposit on the spent catalyst samples, varying amounts of platinum. The catalyst samples in each instance were dried and calcined by heating to a temperature of 850° F. at a rate of about 1° F. per minute.

Upon testing, each of the catalyst samples for dehydrogenation activity, the following results were obtained:

| Example | Platinum Added, percent Wt. | Dehydrogenation Activity |
|---|---|---|
| 5 | 0.0 | 33 |
| 6 | 0.05 | 18 |
| 7 | 0.10 | 36 |
| 8 | 0.20 | 75 |
| | 0.35 | 109 |

The above results are shown graphically in the figure attached hereto. It will be seen from the results obtained and, particularly, from the figure that added amounts of platinum in the range of 0 to 0.1 afforded no improvement in dehydrogenation activity of the treated catalyst. Deposition of 0.05 weight percent platinum, as will be noted, actually caused a decrease in the dehydrogenation activity of the spent catalyst. The reason for this unusual result, which has been repeatedly observed, is unknown. It will further be evident from the foregoing results that a substantial improvement in dehydrogenation activity is not attained until the amount of added platinum is at least about 0.2 weight percent. This added minimum amount of platinum accordingly is critical to the success of the method of the present invention.

It is to be understood that the above description is merely illustrative of preferred embodiments of the invention, of which many variations may be made within the scope of the following claims by those skilled in the art without reparting from the spirit thereof.

I claim:

1. A method for rejuvenating a spent particle-form platinum catalyst containing platinum deposited on a porous supporrnt in place in the reactor vessel without effecting removal of platinum therefrom wherein hydrocarbon conversion utilizing said catalyst is accomplished which comprises burning carbonaceous deposit from the surface of said catalyst laid down during said hydrocarbon conversion, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to the temperature at which said hydrocarbon conversion is effected.

2. A method for rejuvenating a spent particle-form platinum reforming catalyst containing platinum deposited on a porous oxide support in place in a reforming reactor without effecting removal of platinum therefrom which comprises burning carbonaceous deposit from the surface of said catalyst laid down during reforming, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to reforming temperature.

3. A method for rejuvenating a spent particle-form platinum reforming catalyst containing 0.35 to 1 weight percent platinum deposited on an alumina support in place in a commercial reforming reactor without effecting removal of platinum therefrom which comprises burning carbonaceous deposit from the surface of said catalyst laid down during reforming, circulating a cooling gas through the catalyst bed to reduce the temperature thereof to below the boiling point of the platinum compound impregnating solution subsequently employed, contacting the cooled catalyst particles with said impregnating solution of sufficient concentration to deposit thereon additional platinum in an amount of at least 0.2 weight percent, drying and reheating the resulting composite to reforming temperature.

References Cited in the file of this patent

UNITED STATES PATENTS 2,635,080    Appell _____ Apr. 14, 1953